Figure 7:
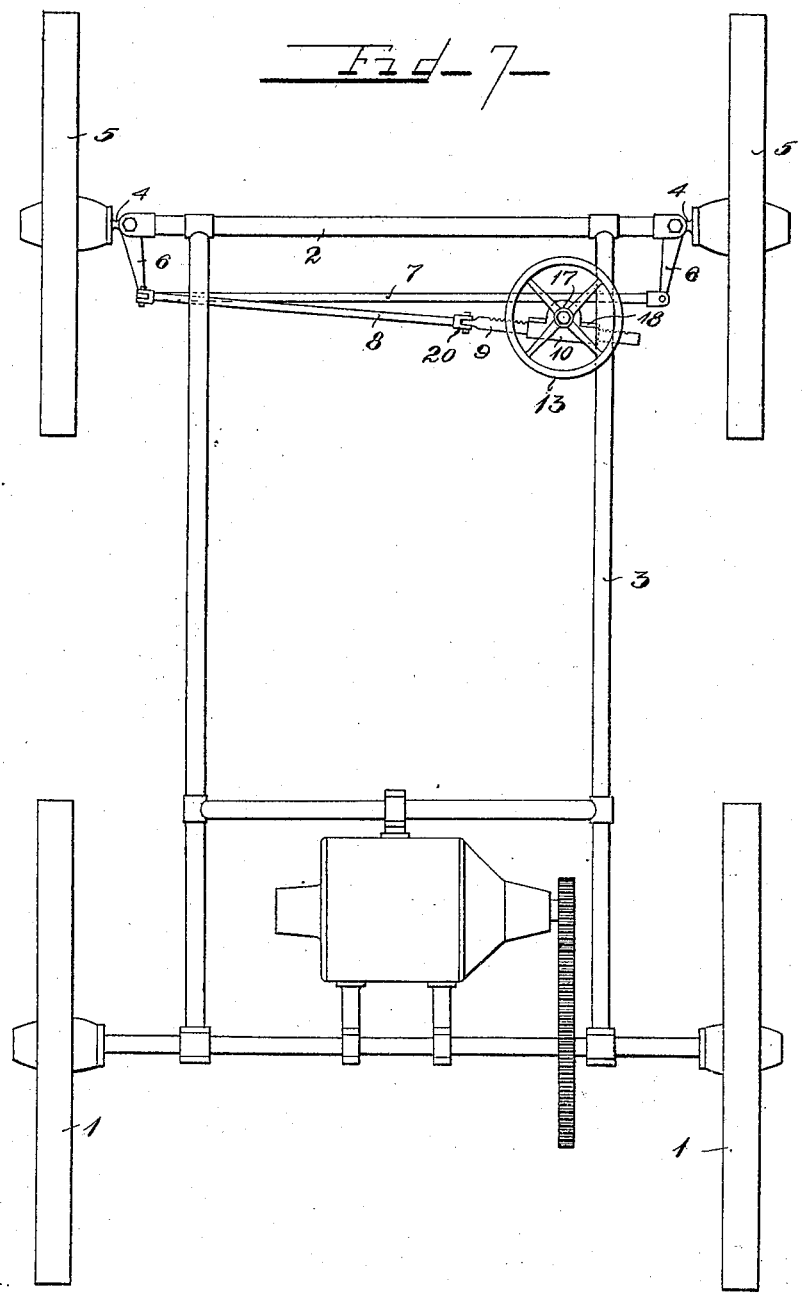

No. 660,291. Patented Oct. 23, 1900.
T. A. DULL.
VEHICLE.
(Application filed Jan. 22, 1900.)
(No Model.) 2 Sheets—Sheet 1.
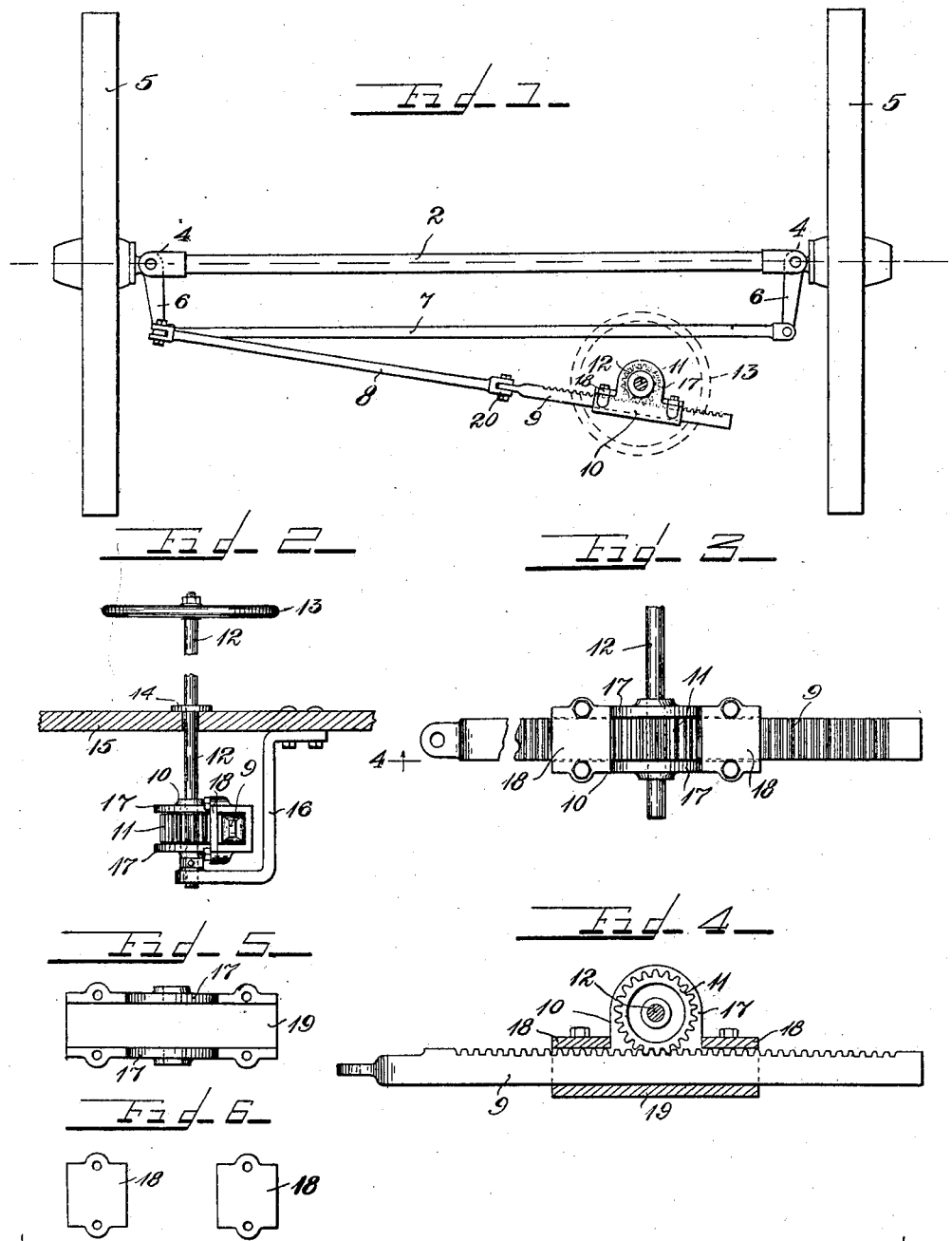
Witnesses
C. J. Schmitt.
Max W. Zabel.
Inventor
Thompson A. Dull
By Charles A. Brown & Cragg
Attorneys No. 660,291. Patented Oct. 23, 1900.
T. A. DULL.
VEHICLE.
(Application filed Jan. 22, 1900.)
(No Model.) 2 Sheets—Sheet 2.

Witnesses
C. J. Schmidt.
May W. Zabel.

Inventor
Thompson A. Dull
By Charles A. Brown & Cragg
Attorneys

UNITED STATES PATENT OFFICE.

THOMPSON A. DULL, OF CHICAGO, ILLINOIS, ASSIGNOR OF ONE-HALF TO HARRY S. FISCHER, OF SAME PLACE.

VEHICLE.

SPECIFICATION forming part of Letters Patent No. 660,291, dated October 23, 1900.

Application filed January 22, 1900. Serial No. 2,294. (No model.)

*To all whom it may concern:*

Be it known that I, THOMPSON A. DULL, a citizen of the United States, residing at Chicago, in the county of Cook and State of Illinois, have invented a certain new and useful Improvement in Vehicles, (Case No. 1,) of which the following is a full, clear, concise, and exact description, reference being had to the accompanying drawings, forming a part of this specification.

My invention relates to automobiles, and has for its object the provision of an improved steering mechanism.

More particularly, my invention has for its object the provision of an improved steering mechanism whereby a hand steering-wheel may be employed to actuate the mechanism, the use of steering-wheels being frequently desirable in limited spaces. I do not wish to be limited, however, exclusively to the employment of hand steering-wheels in operating the steering mechanism.

In accordance with my invention I employ vehicle-steering wheels each mounted upon a knuckle-shaft, the knuckles being mounted to rotate on a shaft of the vehicle, the latter shaft being preferably non-rotatable. The knuckle-stems, which are angularly disposed with relation to the knuckle-shafts, are united by a link, which has a pivotal connection at its ends with the knuckle-stems. A steering-rod is preferably pivotally united with the link, preferably at the point of union of the link with a knuckle-stem. This rod is provided with a rack which is adapted to travel back and forth within a guide, a pinion meshing with the rack and, in the preferred embodiment of the invention, being mechanically coupled with a hand steering-wheel, so that as the hand steering-wheel is rotated by the operator the pinion will be rotated to move the rack back and forth within its guide and effect the desired angular swing of the vehicle-steering wheels. The guide within which the rack is adapted to travel is capable of rotary movement about the axis of rotation of the pinion, so that the rod supporting the rack will not bind as its angular position with relation to the link is changed. I also preferably form the rod in two parts, which are linked or otherwise so united as to permit the members of the rod to swing in vertical planes, so that if the vehicle encounters uneven surfaces in the roadway the operating-rod will not be injured. I preferably so arrange the guide for the rack that binding engagement between the teeth of the rack and the pinion is prevented.

I will explain my invention more particularly by reference to the accompanying drawings, which illustrate the preferred embodiment thereof, in which—

Figure 1 is a plan view of a pair of vehicle-steering wheels in combination with the steering mechanism of my invention. Fig. 2 is a detail view of the rack and pinion, showing the manner in which the same are supported. Fig. 3 is a front elevation of the rack and pinion and the guide for the rack. Fig. 4 is a plan view of the mechanism shown in Fig. 3, the guide being shown in section. Fig. 5 is a front elevation of the guide, the guard-plates for preventing the rack from getting into binding engagement with the pinion being removed. Fig. 6 shows the guard-plates. Fig. 7 is a plan view of the running-gear of a vehicle with the device of my invention shown in place.

Like parts are indicated by similar characters of reference throughout the different figures.

In Fig. 7 I have illustrated a well-known type of running-gear to which the device of my invention is shown as being applied; but other styles of running-gear may be employed. I have shown a pair of wheels 1 1, which may constitute the driving-wheels of the vehicle, to which power may be applied in any well-known way. The driving-wheels, usually the rear wheels, are united with the shaft 2 by framework 3. The shaft 2 is preferably non-rotatable and supports knuckles 4, which are pivotally secured to the ends of the shaft. Guiding-wheels 5 5 are mounted to rotate upon the knuckle-shafts. Knuckle-stems 6 6 are angularly disposed with relation to the knuckle-shafts, the free ends of the knuckle-stems being united by a steering-link 7, which serves when actuated to guide the wheels and to maintain the same in proper relation. The steering-rod 8 preferably has direct pivotal connection with the steering-link at the point of union between the link and one of the knuckle-stems. This steering-rod is provided with a rack 9 at its free end, a guide 10 being provided for directing the travel of the steering-rod and rack. A pinion 11 is preferably provided with a fixed axis of rotation, being in this instance fixed upon a rotating shaft 12, carrying a hand steering-wheel 13 at its upper end. A collar 14 is secured to the portion of the vehicle-body 15 to act as a bearing for the shaft of the hand steering-wheel. A bracket 16 is also secured to the vehicle portion 15 and is provided with a bearing for the lower end of the shaft 12. The guide 10 is provided with ears 17 17, preferably cast integral therewith, which inclose the pinion, these ears being provided with holes through which the shaft 12 is passed, whereby the said guide is capable of rotary motion with relation to the shaft. Guard-plates 18 are provided between which the ears are disposed. These guards may be secured in place by means of bolts. When in place a rectangular casing is formed which incloses the rack, the rear wall 19 of the guiding-casing preventing the rack and pinion from being disengaged, while the guards 18 prevent the rack and pinion from getting into injurious binding contact. As the hand steering-wheel 13 is rotated the link 7, while being maintained in proper relation with the shaft 2, is moved toward and away from the same in effecting the adjustment of the vehicle-steering wheels. As the link changes its position with relation to the vehicle-shaft 2 the angular position of the lever 8 with relation to the link 7 is varied, this variation of the angular relation of the parts 7 and 8 being permitted by the rotation of the guide 10 about the shaft 12. By means of the steering-rod 8 and the rack and pinion provided therefor a direct thrust and pull is effected against the stem of the steering-knuckle connected therewith, this thrust and pull acting in a plane parallel with the plane of the knuckle-stems and the link connecting the same.

The wheels of the vehicle are liable to have their vertical positions changed with relation to the vehicle-body, and in order to permit the portion of the rod 8 supporting the rack to occupy a fixed plane with relation to the vehicle-body or portion 15 and at the same time permit the end of said rod that is united with the steering-link to move with the steering-wheels I form the rod in sections, which are pivotally connected at 20, that portion of the rod intervening between the pivotal connection 20 and the link 7 being capable of movement in a vertical plane as the running-gear changes its position with relation to the vehicle-body.

It is obvious that changes may readily be made in the preferred embodiment of my invention herein shown and particularly described, and I do not, therefore, wish to be limited to the precise construction shown; but,

Having thus described my invention, I claim as new and desire to secure by Letters Patent—

1. In a vehicle, the combination with a vehicle-shaft; of knuckles pivotally connected thereto, and each comprising a shaft and a stem or arm extending laterally therefrom; vehicle-wheels arranged upon the knuckle-shafts; a link connecting the ends of the knuckle stems or arms; an operating-shaft having a pinion located near said connecting-link; a rack gearing with said pinion; and a link or rod connecting said rack with one of said stems or arms.

2. In a vehicle, the combination with a vehicle-shaft; of knuckles pivotally connected thereto, and each consisting of a shaft and an arm extending laterally therefrom; vehicle-wheels arranged upon the knuckle-shafts; a link connecting the ends of said arms; an operating-shaft having a pinion located near said connecting-link; a rack gearing with said pinion; a guide for holding the rack in mesh with the pinion, and pivotally connected so as to allow of a swinging movement as well as a lateral movement on the part of the rack; and a link connecting the rod with one of said arms.

3. In a vehicle, the combination with the vehicle-shaft; of knuckles pivotally connected thereto, and each comprising a shaft and a stem or arm extending laterally therefrom; vehicle-wheels arranged upon the knuckle-shafts; a link connecting the ends of said arms; an operating-shaft having a pinion located near the connecting-link; a guide for holding the rack in mesh with the pinion, said guide being fitted upon the operating-shaft so that the latter serves as a pivot therefor; and a jointed link connecting the rack with one of said arms.

4. In a vehicle, the combination with the vehicle-shaft; of the knuckles pivotally connected thereto, and each comprising a shaft and a laterally-extending stem or arm; vehicle-wheels arranged upon the knuckle-shafts; a link connecting the ends of the knuckle-arms; a link for operating said arms, having its end provided with a rack; a pinion meshing with said rack; and a guide for the rack comprising plates arranged upon opposite sides of the rack, and provided with lugs which confine the pinion, and guard-plates secured to said oppositely-disposed plates, and arranged to maintain the rack at proper distance from the pinion.

In witness whereof I hereunto subscribe my name this 30th day of December, A. D. 1899.

THOMPSON A. DULL.

Witnesses:
GEORGE L. CRAGG,
CHARLES E. HUBERT.